April 26, 1955 W. L. STEUERWALD 2,706,880
HARROW CART
Filed Feb. 15, 1951
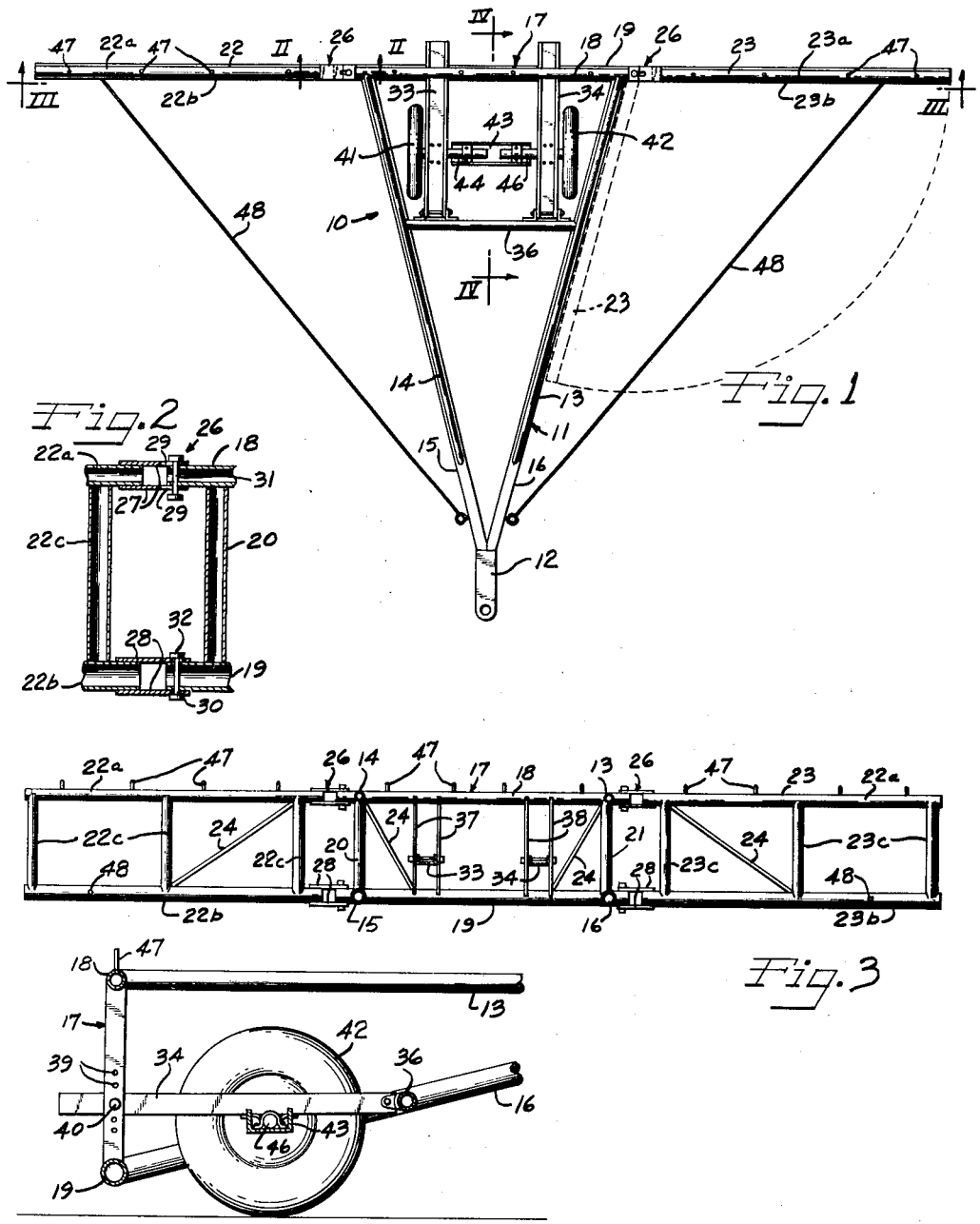
Inventor
Wilfred L. Steuerwald
by Hill, Sherman, Meroni, Gross & Simpson
Attys

United States Patent Office 2,706,880
Patented Apr. 26, 1955

2,706,880

HARROW CART

Wilfred L. Steuerwald, Wolsey, S. Dak.

Application February 15, 1951, Serial No. 211,008

6 Claims. (Cl. 55—73)

This invention relates generally to traction equipment for earth working machinery and more particularly relates to an improved harrow cart construction adapted to provide a mounting support for a plurality of harrow sections or the like.

According to the features of the present invention, an A-frame having a drawbar at the apex thereof is provided with a cross bar portion constructed to have harrow sections connected thereto. A wing structure is pivotally mounted on each side of the cross bar portion of the main frame to which additional harrow sections may be connected. The wing structures are pivotally foldable alongside the main frame and the harrow cart may thus be placed in a specially compact condition for transit purposes. Suitable hook means are provided on the top portion of the cross bar structure as well as on the wing structures so that the harrow sections may be thrown over the top of the frame when it is necessary to move the harrow, for example from one field to another.

A particular feature of the present invention lies in a novel coupling joint between the wing structures and the main frame whereby the wing structures may be pivotally movable upwardly in the event that an obstruction is encountered.

Another feature of the present invention lies in the provision of an adjustable wheel suspension whereby the level of the drawbar may be selectively positioned. The present invention further contemplates the provision of adjustment means to selectively vary the spacing dimension between the wheels mounting the harrow cart so that the wheels may be positioned in accordance with variations determined by row crops.

It is an object of the present invention, therefore, to provide a harrow cart which is highly portable in character and which may be quickly and conveniently adjusted to a full extended position or a compact transit position.

Another object of the present invention is to provide an improved harrow cart having coupling means for adjustable wing sections permitting limited vertical movement of the wing sections.

Still another object of the present invention is to provide a harrow cart wherein the level of the drawbar may be selectively varied.

Yet another object of the present invention is to provide a harrow cart having means to adjust the spacing dimension between the wheels.

Many other features, advantages and additional objects of the present invention will become manifest to those versed in the art upon making reference to the detail description which follows and the accompanying sheet of drawings in which a preferred embodiment of a harrow cart incorporating the principles of my invention is shown.

On the drawings:

Figure 1 is a plan elevational view of a harrow cart constructed in accordance with the principles of the present invention;

Figure 2 is an enlarged fragmentary cross-sectional view with parts shown in elevation taken on line II—II of Figure 1;

Figure 3 is a cross-sectional view with parts shown in elevation taken on line III—III of Figure 1; and Figure 4 is a cross-sectional view with parts shown in elevation taken on line IV—IV of Figure 1.

As shown on the drawings:

The harrow cart of the present invention is indicated generally by the reference numeral 10 and includes an A-frame 11 having a hitch 12 at the apex thereof with a pair of upper side members 13 and 14 and a pair of lower side members 15 and 16 extending divergently away therefrom.

The open end of the A-frame 11 is closed by a cross bar structure 17 including an upper cross bar 18, a lower cross bar 19 and a pair of spaced apart vertical members 20 and 21, respectively.

A wing structure is pivotally mounted on each side of the cross bar structure 17 and includes a first wing structure 22 and a second wing structure 23. The wing structures 22 and 23 are similarly constructed and comprise generally a box frame construction including upper members 22a and 23a, lower members 22b and 23b and a plurality of spaced apart vertical support members 22c and 23c.

It will be understood that suitable struts 24 may be provided between the upper and lower members of the cross bar structure 17 as well as of the wing structures 22 and 23 in order to further rigidify the frame structure.

The coupling joint between each of the wing structures 22 and 23 and the A-frame 11 incorporates one of the features of the present invention in that limited vertical movement of each of the wing structures is permitted.

Each of the coupling joints is indicated on Figure 1 generally by the reference numeral 26 and the details of construction may be best understood by referring to Fig. 2. It will be noted that an upper pair of spaced strap irons 27 are firmly connected to the upper members 22a and a lower pair of spaced strap irons 28 are firmly fixed to the lower members 22b. A pair of registering slots 29 are formed in the upper strap irons 27 and a pair of registering holes 30 are provided in the lower strap irons 28.

A pivot pin 31 extends through the upper cross bar 18 and is received by the slots 29 and a pivot pin 32 is extended through the lower cross bar 19 for reception by the holes 30. Thus the wing structures and the cross bar structures are connected in a coupling relationship with one another and the wing structures 22 and 23 are pivotally supported by the lower strap irons 28 for limited movement upwardly in a vertical plane, the limits of movement being prescribed by the relationship of the slots 29 to the pivot pin 31.

The provision of the coupling joint 26 between each of the wing structures 22 and 23 and the A-frame 11 is highly advantageous since it permits the outside of the wing structure to raise in the event that an obstruction such as a rock is encountered, or if the cart 10 is proceeding over uneven ground and the wheels drop into a depression causing the end of the wing structures 22 and 23 to strike the ground.

Referring now to Figure 4 in connection with Figure 1, it will be noted that a wheel support means is provided which includes a pair of channels 33 and 34 pivotally connected to a cross bar 36 attached to a medial portion of the lower side frame members of the A-frame 11. The wheel support members 33 and 34 extend rearwardly and pass between spaced pairs of vertical support members 37 and 38 are preferably provided with a plurality of aligned spaced apart apertures 39 to receive a pin 40 extending through each of the wheel support members 33 and 34 so that the wheel support members 33 and 34 may be adjustably positioned relative to the A-frame 11.

An axle means mounts a pair of spaced apart wheels 41 and 42 on the wheel support members 33 and 34 so that movement of the wheel support members 33 and 34 will effect the relative support of the cart construction, thereby to selectively vary the height of the lower cross bar 19 and the lower members 22b and 23b, which constitute drawbars to which equipment is fastened to the cart 10. This is a highly advantageous feature since the operator is able to set the drawbars 19, 22b and 23b at various levels to do different types of work with the harrow equipment utilized in connection with the harrow cart 10.

In this particular embodiment, the axle means takes the form of a channel 43 mounting a split axle, or in other words, a stub axle 44 and a stub axle 46 for each of the wheels 41 and 42, respectively. Means are provided to connect the stub axles 44 and 46 on each of the wheel support members 33 and 34 in selected adjusted position so that the wheels 41 and 42 may be set in or out in accordance with the varying width of row crops with which the harrow cart 10 may be used.

It will be noted upon making reference to the dotted line position of the wing structure 23 in Figure 1 that the wing structures 22 and 23 may be pivotally folded next to the side frame members 13 and 14 of the A-frame 11. After the wings are retracted into such position, a small chain used to hold the wing structures in working position may be used to keep them in place. The harrow cart 10 is thus converted into an especially compact form and may be easily transported from one working area to another.

In open position, each of the wing sections 22 and 23 is retained in aligned co-planar relation with the cross bar structure 17 by a chain 48 attached to the A-frame 11. In order to facilitate the disposition of the harrow sections when the harrow cart 10 is in transit from one working area to another, the upper members 22a and 23a of the wing structures 22 and 23 as well as the upper cross bar 18 are provided with a plurality of spaced apart hook means 47. The harrow sections may be thrown over the top of the frame and will be retained by the hook means 47.

It will be understood that the cart 10 may be equipped with pneumatic tires or rubber tires so that transportation of the cart 10 will be easily effected.

Although various minor structural modifications might be suggested by those versed in the art, it should be understood that I wish to cover within the scope of this patent all such modificaions as reasonably and properly come within the scope of my contribution to the art.

I claim as my invention:

1. In a harrow cart having a wheel mounted primary frame structure adapted to be power driven and including a box frame portion and a box frame wing structure on each side of said box frame portion, the improvement of a pivotal mounting joint between each of said wing structures and said box frame portion, said pivotal mounting joint comprising an upper pair of spaced strap irons having registering slots formed therein, a lower pair of spaced strap irons having registering holes formed therein, a pivot pin extending through said slots and a pivot pin extending through said holes, said wing structures and said box frame portion being firmly connected to said strap irons and said pivot pin respectively in pivotal coupling relationship with one another relative to a vertical pivot axis, said wing structures being movable upwardly in a vertical plane within the limits prescribed by said slots and the pivot pin extending therethrough.

2. In a harrow cart construction of the type having a wing section pivotally coupled to a main frame, the improvement of a coupling joint accommodating limited vertical movement of the wing section relative to the main frame comprising an upper support member having a slot formed therein, a lower support member having a hole formed therein and a pivot pin extending through said slot and through said hole, said support members and said pivot pins adapted to join the wing section and the main frame in coupled relationship for pivotal movement about a vertical pivot axis, said lower support member adapted to pivotally support the wing section for vertical movement within the limits prescribed by the slot in said upper support member.

3. A folding drawbar for harrow sections comprising an upstanding crossbar frame and frame wings adapted to be pivoted on vertical axes at the ends of said crossbar frame and foldable thereon, said frame wings and said crossbar frame each comprising a tubular skeleton box frame structure including coaxially disposed upper and lower tubular support members, respective pairs of said tubular support members being joined by cross struts, each adjoining coaxially disposed pair of tubular support members between one of said frame wings and a corresponding end of said crossbar frame having a coupling joint therebetween comprising a pair of spaced strap irons connected to upper and lower sides of one tubular support member and projecting longitudinally thereof adjacent upper and lower sides of an adjoining tubular support member, and pivot pin means through said strap irons and through said adjoining tubular support member, the uppermost of said strap irons having elongated slots formed therein cooperating with said pivot pin means to prescribe limited upward movement of said wings in a vertical plane, a main frame connected to the upper and lower support members of said crossbar frame and extending forwardly thereof, a wheel support frame pivoted at its front end to said main frame and extending rearwardly toward said crossbar frame, ground engaging wheels on said wheel support frame, and vertically adjustable connecting means between the rear end of said wheel support frame and said crossbar frame to adjust the elevation of said crossbar frame relative to the ground.

4. In a harrow cart, a main frame having a hitch portion at the front end thereof adapted to be connected to a power driven mover, said frame having a substantially vertical drawbar portion spaced from said hitch portion at the rear end thereof, wheel support means medially pivotally connected at one end to said frame intermediate said hitch portion and said vertical drawbar portion and extending rearwardly thereof, axle means carried by said wheel support means at a medial portion and transversely thereof, ground engaging wheels on said axle means adapted to engage a supporting surface, and adjustable locking means between the other end of said wheel support means and said vertical drawbar portion to selectively vary the elevation of said vertical drawbar portion relative to the ground, an adjustable locking means which comprises a vertical drawbar portion having a plurality of spaced apart vertically aligned apertures and pin means on said vertical support means to be selectively received by said apertures to lock same in adjusted position, said wheel support means comprising a pair of spaced apart rearwardly extending support members and said axle means comprising a split axle having its respective halves separately clamped to each of said support members, said axles being laterally adjustably positionable to vary the spacing dimension between the wheels.

5. In a harrow cart, an A-frame, a hitch at the apex of said A-frame, a crossbar structure closing the open end of said A-frame and having a vertical support member, a pair of rearwardly extending wheel support members each having one end pivotally connected to said A-frame intermediate the hitch and the cross bar structure, axle means supported by said wheel support members transversely thereof, a pair of spaced apart wheels on said axle means adapted to engage the ground, and adjustable locking means between said vertical support member and the other end of each of said wheel support members to selectively vary elevation of said crossbar structure relative to the ground, said axle means comprising a split axle having its respective halves separately clamped to each of said wheel support members, said axle elements being laterally adjustably positionable to vary the spacing dimension between said wheels.

6. A folding drawbar for harrow sections comprising a frame having ground contacting wheels, an upstanding crossbar frame member on said frame of a length substantially equal to the length of harrow sections to be used, and frame wings adapted to be pivoted on vertical axes at the ends of said crossbar frame and foldable thereon, each wing and said crossbar frame member having coaxially disposed upper and lower horizontally extending support members, and a coupling joint between each respective pair of support members of said wings and said crossbar frame member comprising spaced strap irons carried by one of said support members and projecting longitudinally beyond the end thereof to embrace an adjoining support member, and pivot pin means extending through each respective pair of strap irons and said adjoining support member, the uppermost of said strap irons having elongated slots formed therein cooperating with said pivot pin means to prescribe limited upward movement of said wings in a vertical plane.

References Cited in the file of this patent

UNITED STATES PATENTS

| | | |
|---|---|---|
| 187,470 | Lee | Feb. 20, 1877 |
| 223,982 | Blodgett et al. | Feb. 3, 1880 |
| 1,670,602 | Webber | May 22, 1928 |
| 1,927,458 | Klise | Sept. 19, 1933 |
| 1,963,426 | Taylor | June 19, 1934 |
| 2,164,577 | Crinkshank | July 4, 1939 |
| 2,519,717 | Stolen | Aug. 22, 1950 |
| 2,597,533 | Rogers | May 10, 1952 |